United States Patent [19]

Kingsbury et al.

[11] Patent Number: 4,787,170
[45] Date of Patent: Nov. 29, 1988

[54] LOW OXYGEN SCENTED MOUSE TRAP

[75] Inventors: William E. Kingsbury; Kenneth R. Bernard, both of Haverhill, Mass.

[73] Assignee: Pied Piper International, Inc., Plaistow, N.H.

[21] Appl. No.: 860,140

[22] Filed: Aug. 14, 1986

[51] Int. Cl.$^4$ ............................................. A01M 23/02
[52] U.S. Cl. ............................................. 43/61; 43/58
[58] Field of Search .......................... 43/58, 60, 61, 74

[56] References Cited

U.S. PATENT DOCUMENTS

| | | | |
|---|---|---|---|
| 1,286,898 | 12/1918 | Ammen | 43/61 |
| 1,415,093 | 5/1922 | Hurley | 43/61 |
| 1,590,879 | 6/1926 | Boynton | 43/61 |
| 1,747,380 | 2/1930 | McCully | 43/61 |
| 2,475,462 | 7/1949 | Rosen | 43/61 |
| 2,518,819 | 8/1950 | Roessler | 43/61 |
| 4,232,472 | 11/1980 | Muelling | 43/61 |
| 4,318,241 | 3/1982 | Fassauer | 43/58 |
| 4,335,535 | 6/1982 | Lindley | 43/61 |
| 4,413,439 | 11/1983 | Lindley | 43/61 |
| 4,550,523 | 11/1985 | Spiller | 43/61 |
| 4,557,067 | 12/1985 | Ha | 43/61 |
| 4,578,892 | 4/1986 | Melton | 43/61 |
| 4,583,317 | 4/1986 | Beard | 43/61 |

FOREIGN PATENT DOCUMENTS 562244 10/1932 Fed. Rep. of Germany .......... 43/61

Primary Examiner—M. Jordan
Attorney, Agent, or Firm—Philip G. Koenig

[57] ABSTRACT

A reusable or disposable rodent trap is described having only two discrete parts, particularly suited for trapping small animals including rodents such as mice, in which the trapped animal may be made to expire by asphyxiation rather than trauma or poison. The trap comprises an enclosure typically having the shape of an elongated box with an opening at one end, and closing said opening a hinged one-way door adapted to swing freely upward into the enclosure to permit entry into the enclosure by an animal, said door having on its surface a plurality of small orifices to allow the diffusion to the exterior of the trap of scent from bait placed within the otherwise nearly air-tight trap. A rodent attracted by bait scent emanating from the orifices in the door is able to enter the trap by pushing against the closed door, thereby causing it to pivot upwardly open into the enclosure. However the door will fall back under the force of gravity to a closed position behind the rodent once the body of the rodent moving towards bait placed at the rear of the trap has passed fully under and beyond the lower edge of the raised door, trapping the rodent within a nearly air-tight enclosure in which it will expire within a short time from asphyxiation unless released.

2 Claims, 2 Drawing Sheets

LOW OXYGEN SCENTED MOUSE TRAP

BACKGROUND OF THE INVENTION

I. Field of the Invention

This invention relates generally to the design of an improved animal trap, and more specifically to a design which permits simplicity of manufacture, reliability, ease and safety of operation, and sanitary handling of trapped animal bodies.

II. Description of the Prior Art

The art of animal traps is old and includes many designs that may generally be divided into two broad categories including traps that physically maim or kill the animal, such as the well-known spring-loaded snap trap, and traps that capture the animal within an enclosure. Some of the enclosure traps provide an airtight enclosure in which the animal dies by asphyxiation.

The familiar spring-loaded snap trap has achieved commercial success because of its low cost, but it presents several serious disadvantages, including the possibility of injury to the user in setting the trap, or to small children and household pets who may trigger the trap accidentally. In addition such traps are unsanitary and offensive to dispose of, to a degree that makes them wholly unsuitable for many consumers and for many commercial applications including food-handling establishments and health facilities.

The enclosure traps of the prior art generally overcome these disadvantages of the spring-loaded snap traps, but the relative complexity of the enclosure traps, and their resultant high cost, have limited their usefulness and success. Recent enclosure traps for example as disclosed in Spiller U.S. Pat. No. 4,550,523 and in Melton U.S. Pat. No. 4,578,892 employ fewer and simpler components than older enclosure traps. These more recent traps have been designed to use, in lieu of the spring or trip driven door-closing mechanisms of earlier enclosure traps, the weight of a rodent moving across the fulcrum of a tiltable enclosure, to tilt the enclosure in a manner that causes a door member biased in an upwardly open position to fall of its own weight across the opening of the enclosure.

However the traps disclosed in Spiller and Melton have the disadvantages that they may be prematurely sprung for example by mice climbing onto the top surface of the tiltable enclosure in the course of investigating the trap, and that the complex configurations of the door members of the Spiller and Melton traps present manufacturing difficulties and thus expense. Animal traps of the present invention are considered to be a substantial advance and improvement in overcoming these disadvantages.

SUMMARY OF THE INVENTION

The animal trap of the present invention consists of only two discrete and easily manufactured parts, the larger component being an elongated enclosure having parallel sides and a rectangular opening made of a suitable material to retain the particular animal for which it is set. Preferably, the enclosure is readily capable of low cost manufacture for example from a transparent or translucent plastic material by such techniques as plastic injection or blow molding. The second component is an integral type door containing on its surface small orifices to permit the escape of scent from bait placed within the enclosure. This door is of simple and reliable configuration and operation, being designed simply to hang pivotally within the enclosure and to swing open freely but only inward, being restrained from opening outward by a doorstop.

The trap of the present invention does not require resetting, and therefore it may be manufactured in alternate embodiments capable of trapping as many animals in succession as the interior space of the trap enclosure will accomodate.

Rodent traps in accord with the present invention overcome the disadvantages of conventional traps, are of simple and low cost configuration, and therefore are commercially more attractive than conventional traps.

In a preferred embodiment, a rodent trap is provided having substantially uniform integral configuration particularily suitable for low cost plastic molding or plastic injection manufacture.

Rodent traps in accord with the present invention and designed so that they are not sprung prematurely or accidentally and therefore they are more reliable in operation than conventional traps, and are generally free of the risks of injury to the user, small children and pets that are presented by spring-loaded traps.

BRIEF DESCRIPTION OF THE DRAWINGS

The present invention will be more fully understood as a result of a detailed description of preferred embodiments of the invention considered in conjunction with the following drawings in which.

DESCRIPTION OF PREFERRED EMBODIMENTS

Figure 1:
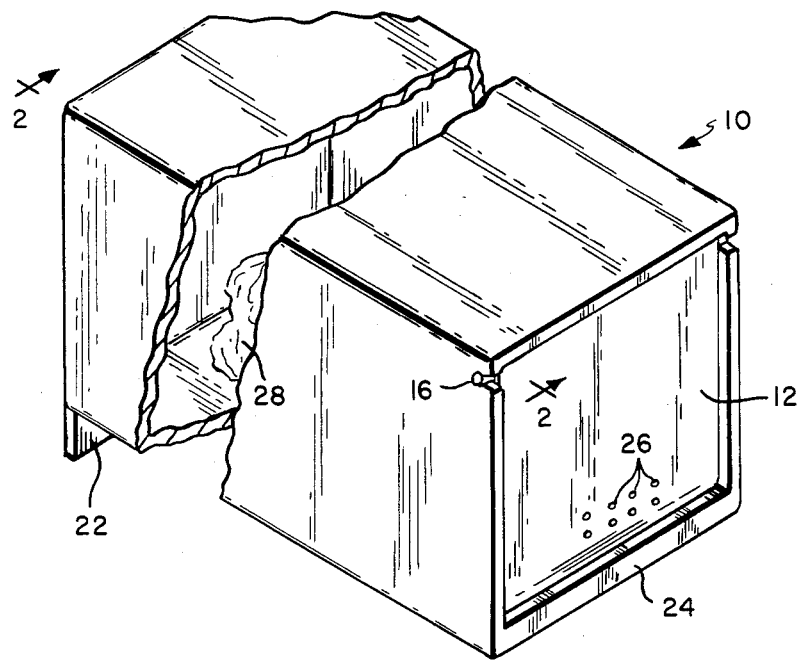
FIG. 1 is a three-dimensional view of a first embodiment of a rodent trap according to the invention.
Figure 2:
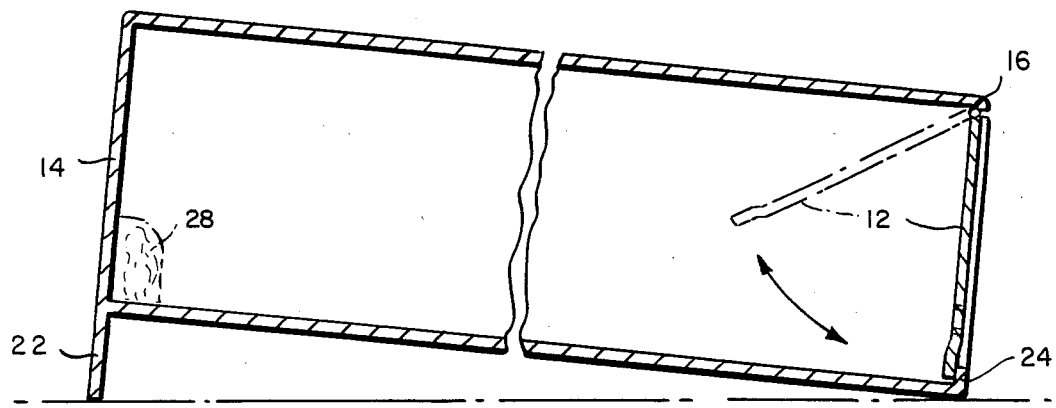
FIG. 2 is a is a cross-sectional side view of of the first embodiment of the invention illustrating the manner in which the door operates.
Figure 3:
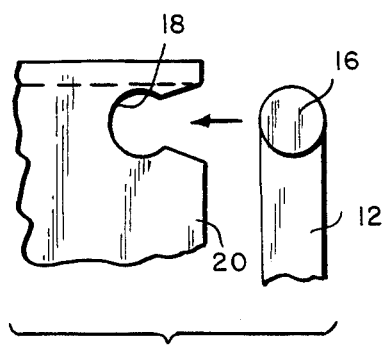
FIG. 3 is an enlarged view of a portion of the enclosure showing the snap-in hinge receptacle.

Referring first to FIGS. 1-3 there is indicated an animal trap consisting of two discrete parts, whose proportions will be determined by the size of the animal to be trapped. Referring to FIG. 1 there is illustrated an elongated rectangular enclosure 10 having one closed end and at the other end a door 12 (for sealing the enclosure) pivotally attached to the enclosure by means of snap-in hinges. The hinges each consist of an appendage 16, extending sideward from the top of the door, that snaps into and pivotally engages a receptacle 18 channeled to the front edge 20 of each side of the enclosure. A surface 22 extends downward from the rear surface 14 of the enclosure and causes the enclosure to incline downward from the closed end to the open end of the enclosure when set on a flat surface, thereby causing the bottom of the pivotally hanging door 12 to contact at a slight angle from the vertical and to form a seal with a second surface 24 positioned along the base of the opening to form a doorstop and seal. The door 12 contains on its surface a plurality of small orifices 26 to allow the escape of scent from bait 28 placed in the enclosure.

Figure 4:
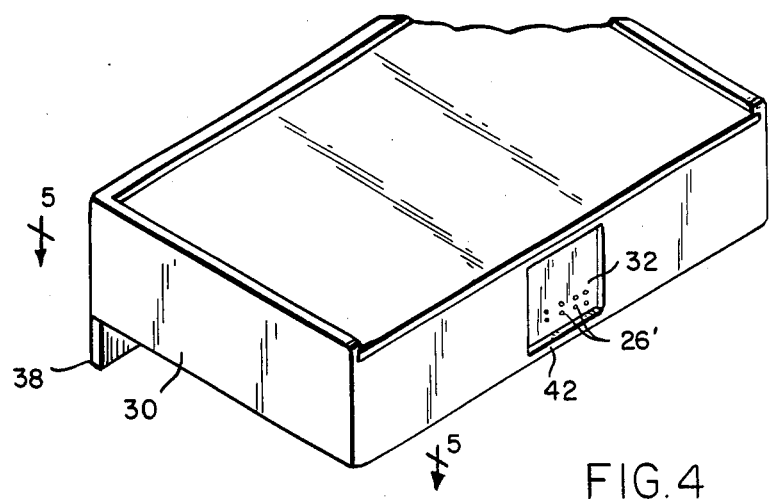
FIG. 4 is a three-dimensional view of a second embodiment of a rodent trap according to the invention.
Figure 5:
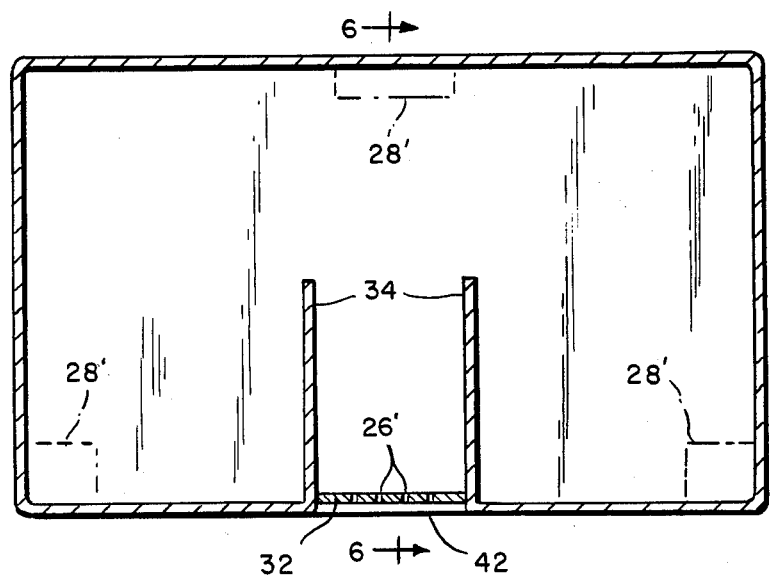
FIG. 5 is a cross-sectional top plan view of the lmbodiment shown in FIG. 4.
Figure 6:
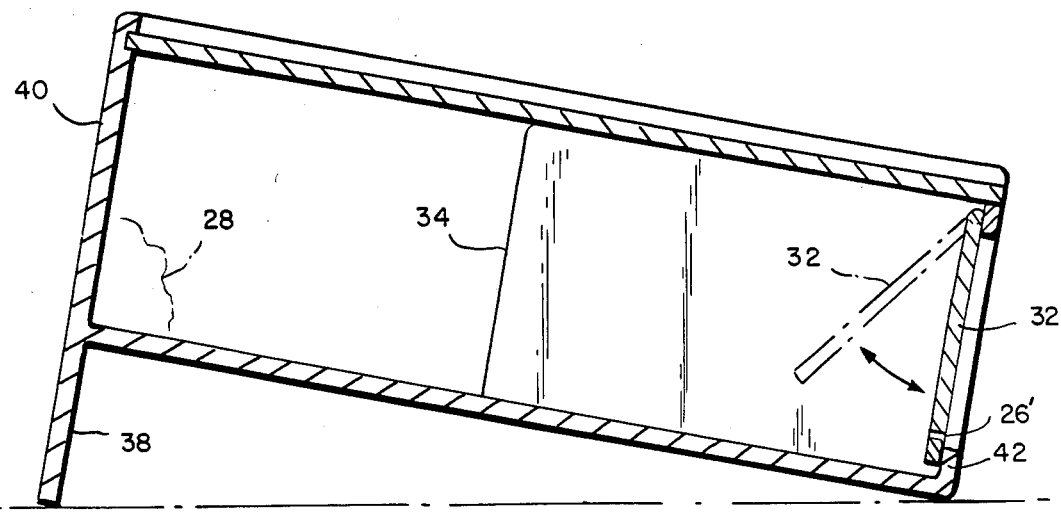
FIG. 6 is a cross-sectional side view of the embodiment shown in FIG. 4.

FIGS. 4-6 illustrate an alternative embodiment of the trap according to the invention comprising a rectangular enclosure 30 of sufficient size to contain about six to ten rodents, the enclosure having on its front side a door 32 for sealing the enclosure, said door opening into a corridor extending perpendicular to the front of the enclosure part way into the enclosure and defined by rectangular interior walls 34 with a vertical dimension equal to the vertical dimension of the interior of the enclosure and a horizontal dimension approximately equal to the body length of the species of animal intended to be trapped.

The door 32 is pivotally attached to the interior walls 34 by means of snap-in hinges in the same manner as shown in FIGS. 1-3 for the first embodiment.

Also similarly to the embodiment previously illustrated in FIGS. 1-3, a surface 38 extends downward from the rear surface 40 of the enclosure and causes the enclosure to incline downward from the rear to the front side of the enclosure when set on a flat surface, thereby causing the bottom of the door 32 to contact at a slight angle from the vertical and to form a seal with a second surface 42 positioned along the base of the opening to form a doorstop and seal. The door 32 contains on its surface a plurality of small orifices 26' to allow the escape of scent from bait 28' placed in the enclosure.

Referring to FIG. 1 the door 12 will readily open inward into the enclosure 10 when nudged by a rodent attracted to enter the enclosure by bait scent diffusing through the small orifices 26 in the door from bait placed within the enclosure near its closed end. When the body of the rodent entering the enclosure has moved through the opening in the enclosure and past the door 12 which is pivoted upward by the rodent, gravity will cause the door to rotate downward to a closed position with its bottom edge coming to rest against the surface 24 positioned across the base of the opening, thereby trapping the animal within the enclosure.

The airflow through the small orifices 26 in the door 12 is insufficient to support the oxygen requirements of the entrapped rodent after it has exhausted the oxygen within the enclosure, and unless released from the enclosure the entrapped rodent will expire from asphyxiation within a few hours. The entire trap containing the body of the rodent may then be discarded, or, alternatively, the body of the rodent may be discarded by turning the enclosure 10 upside down, which will cause gravity to open the door 12, and emptying the trap with the door thus opened.

The trap of the present invention illustrated in the alternate embodiment of FIGS. 4-6 operates in substantially the same fashion as the trap illustrated in FIGS. 1-3, and, in addition, it includes an enclosure of sufficient dimensions to entrap and contain a plurality of rodents without any need to reset or attend to the trap in any way.

Traps of the present invention are preferably provided with a suitable form of bait material 28 which may be in the form of peanut butter, cheese or other substance which releases a scent attractive to rodents or other animals sought to be trapped.

What is claimed is:

1. An animal trap comprising:
    an enclosure having an opening for permitting entry by an animal;
    a one-way door hinged to the top of said opening, said door being adapted to close said opening and to swing freely upward into the enclosure; and means to allow the escape of scent from bait placed in the enclosure, which means to allow the escape of scent does not permit sufficient airflow into the enclosure to satisfy the oxygen requirements of an animal caught in the trap.

2. An apparatus according to claim 1 in which said means to allow the escape of scent comprises a plurality of small orifices in the door of the enclosure, said orifices having an aggregate surface area of about 0.025 square inches.

* * * * *